(12) United States Patent
Chirrey et al.

(10) Patent No.: US 11,396,905 B2
(45) Date of Patent: Jul. 26, 2022

(54) CENTER LINKAGE APPARATUS

(71) Applicant: STEMCO PRODUCTS, INC., Charlotte, NC (US)

(72) Inventors: William Chirrey, Ontario (CA); Paul Dolan, Clio, MI (US); Altan Ugurkan, Istanbul (TR); James Allen Baker, Vassar, MI (US)

(73) Assignee: Stemco Products, Inc., Charlotte, NC (US)

( * ) Notice: Subject to any disclaimer, the term of this patent is extended or adjusted under 35 U.S.C. 154(b) by 239 days.

(21) Appl. No.: 16/465,028

(22) PCT Filed: Nov. 30, 2017

(86) PCT No.: PCT/US2017/063877
§ 371 (c)(1),
(2) Date: May 29, 2019

(87) PCT Pub. No.: WO2018/102511
PCT Pub. Date: Jun. 7, 2018

(65) Prior Publication Data
US 2019/0323549 A1    Oct. 24, 2019

Related U.S. Application Data

(60) Provisional application No. 62/577,320, filed on Oct. 26, 2017, provisional application No. 62/429,530, filed on Dec. 2, 2016.

(51) Int. Cl.
*F16C 7/00* (2006.01)
*B62D 7/20* (2006.01)
*F16C 11/06* (2006.01)

(52) U.S. Cl.
CPC .................. *F16C 7/00* (2013.01); *B62D 7/20* (2013.01); *F16C 11/06* (2013.01); *F16C 2326/24* (2013.01)

(58) Field of Classification Search
CPC ........ F16C 7/00; F16C 11/06; F16C 2326/24; F16C 7/06; B62D 7/20
(Continued)

(56) References Cited

U.S. PATENT DOCUMENTS 3,498,652 A * 3/1970 Cass ......................... F16B 7/06
403/43
4,162,859 A    7/1979 McAfee
(Continued)

FOREIGN PATENT DOCUMENTS

| CN | 206766118 U | 12/2017 |
|---|---|---|
| DE | 7732250 U1 | 2/1978 |
| KR | 19980038419 U | 9/1998 |

OTHER PUBLICATIONS

International Search Report and the Written Opinion of the International Searching Authority, or the Declaration for International Application No. PCT/US2017/063877 dated Nov. 30, 2017, 7 pages.
(Continued)

*Primary Examiner* — Muhammad Ijaz
(74) *Attorney, Agent, or Firm* — Perkins Coie LLP

(57) ABSTRACT

The apparatus includes a first tie rod end component having a first threaded surface and a second tie rod end component having a second threaded surface. The first and second tie rod end components are configured to rotatably couple to a center component in opposite directions. The tie rod end components each include a groove designed to assist a user in determining whether the tie rod ends are properly coupled to the center component. If the groove is visible to a user then the tie-rod end is not screwed in far enough. In contrast, it the groove is hidden that indicates that the tie rod end component and the center component are properly assembled to each other.

19 Claims, 13 Drawing Sheets

(58) Field of Classification Search
USPC .............................. 248/227.4; 403/123, 79
See application file for complete search history.

(56) References Cited

U.S. PATENT DOCUMENTS

| | | | | | |
|---|---|---|---|---|---|
| 5,306,095 | A | * | 4/1994 | Snitgen | B62D 7/20 |
| | | | | | 403/354 |
| 5,603,583 | A | * | 2/1997 | Jackson | F16C 7/06 |
| | | | | | 403/46 |
| 5,765,957 | A | * | 6/1998 | Connell | F16C 7/06 |
| | | | | | 403/44 |
| 5,795,092 | A | * | 8/1998 | Jaworski | B60G 7/003 |
| | | | | | 403/56 |
| 5,813,794 | A | * | 9/1998 | Castellon | F16D 3/06 |
| | | | | | 280/777 |
| 2016/0123380 | A1 | * | 5/2016 | Godon | F16B 11/008 |
| | | | | | 156/60 |

OTHER PUBLICATIONS

International Preliminary Report on Patentability (Chapter 1 of the Patent Cooperation Treaty) of the International Bureau for International Application No. PCT/US2017/06387, dated Jun. 13, 2019, 6 pages.

* cited by examiner

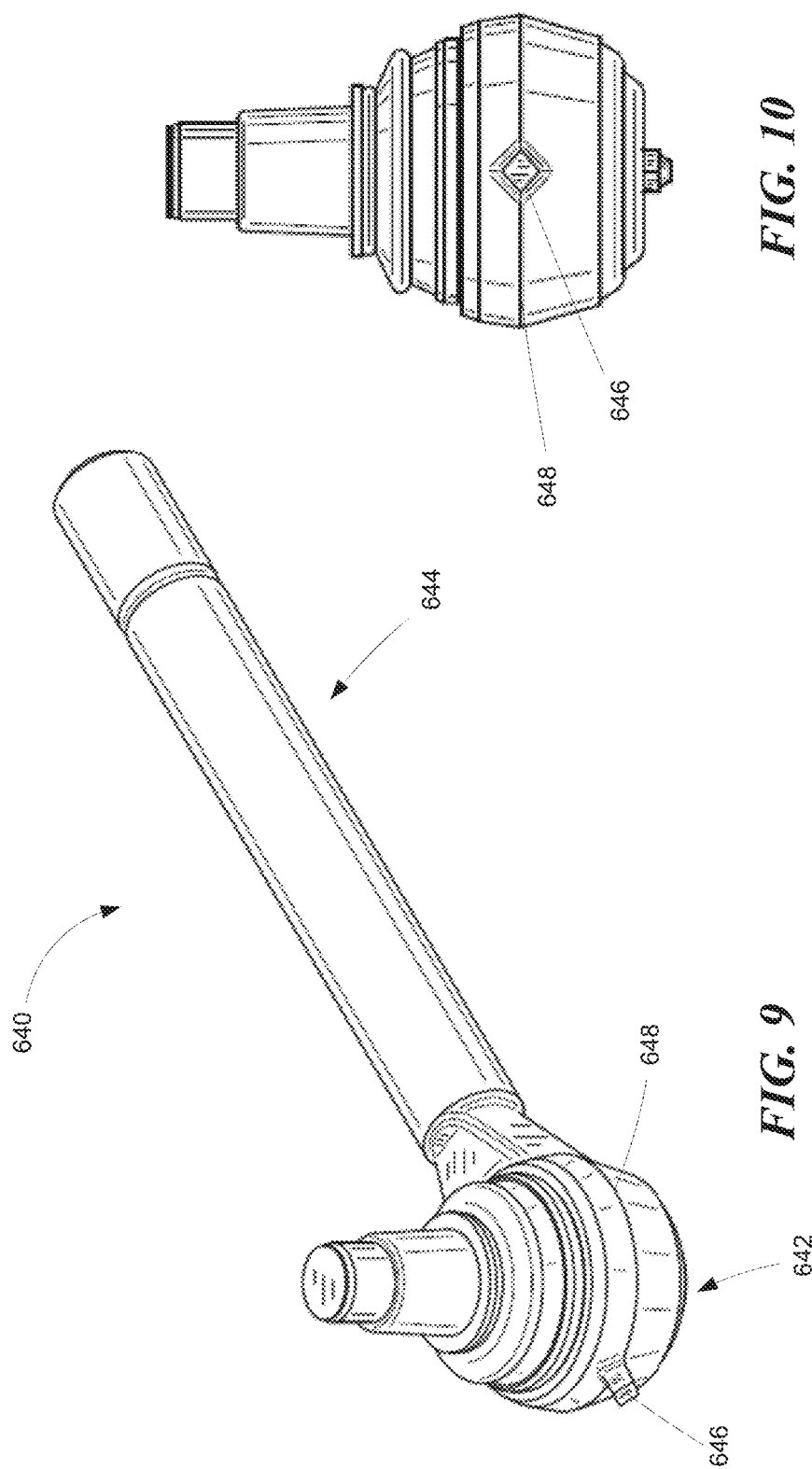

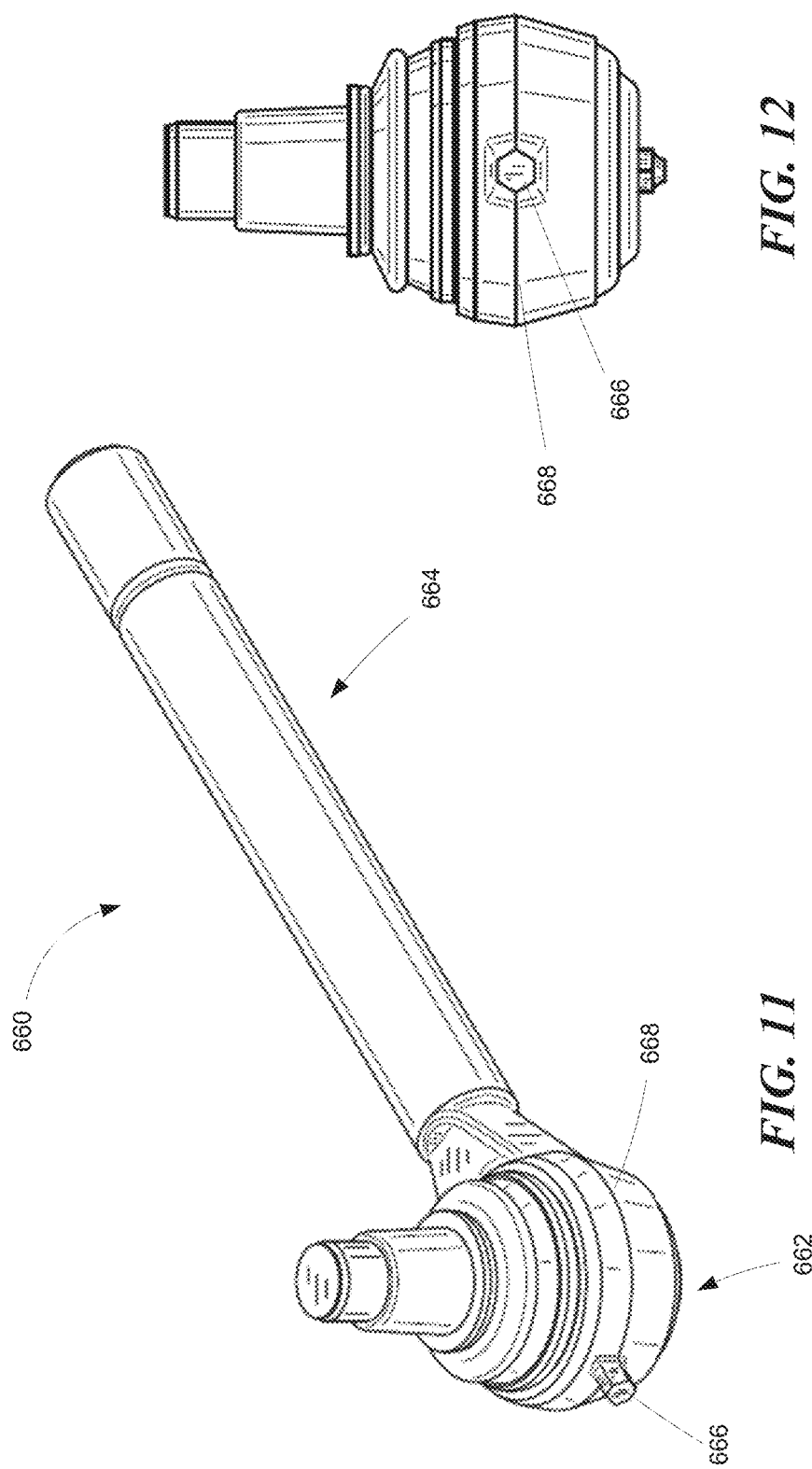

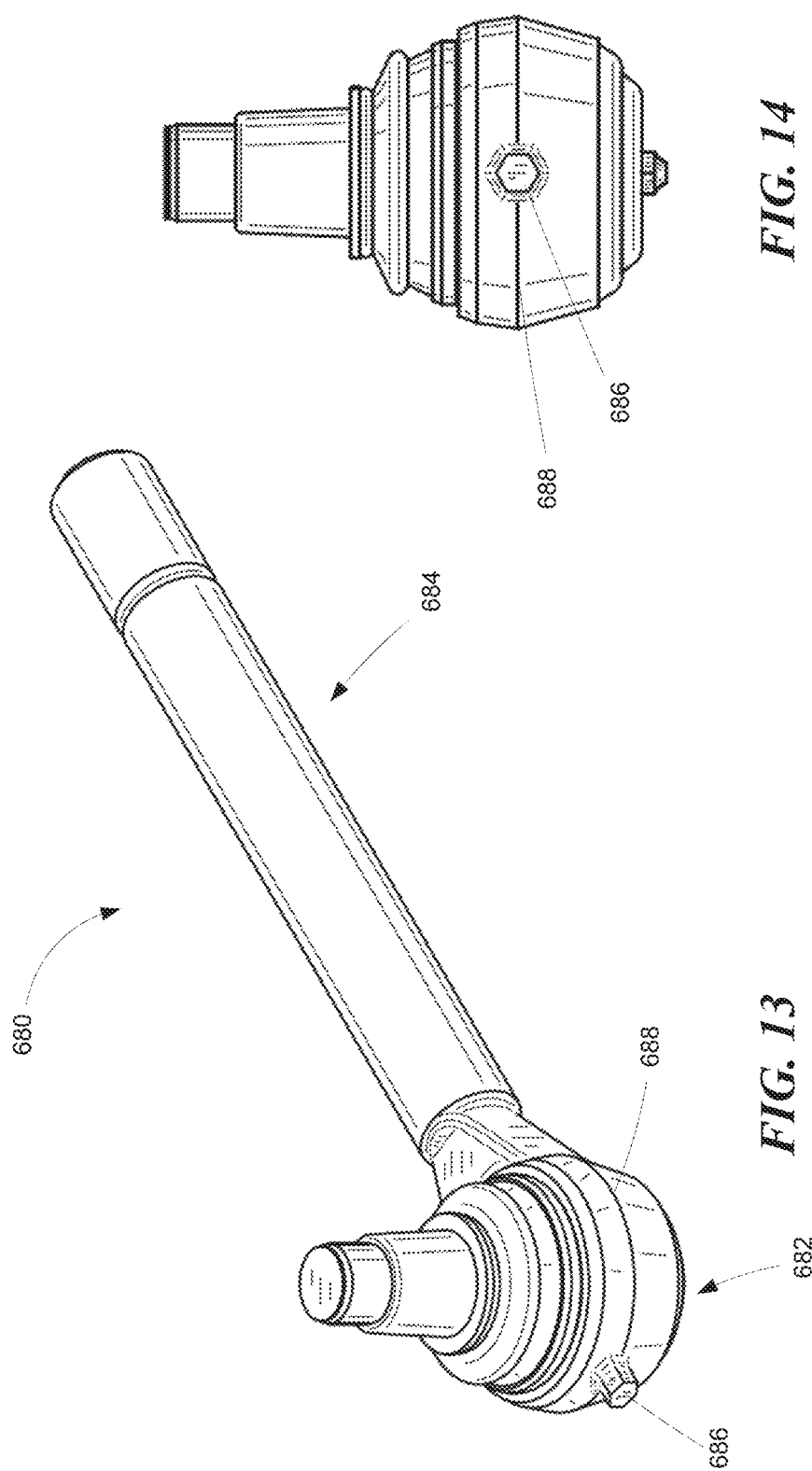

CENTER LINKAGE APPARATUS

CROSS-REFERENCE TO RELATED APPLICATIONS

This application claims the benefit of and priority to U.S. Patent Application No. 62/429,530, filed Dec. 2, 2016, and U.S. Patent Application No. 62/577,320 filed Oct. 26, 2017, the disclosures of which are incorporated herein by reference in their entireties.

TECHNICAL FIELD

This patent application is directed to an apparatus for effectively connecting a first component and a second component of a moveable system and more specifically, a center linkage apparatus for connecting two spindles of a vehicle.

BACKGROUND

To facilitate steering control of a vehicle having two or more spindles (which are further coupled to corresponding wheels), it is common to use a center tube to connect the spindles. To achieve this goal, the center tube needs to be properly coupled to the spindles. For example, the center tube can be coupled to the spindles by tie rod end components. Due to various designs of the spindles adopted by different vehicle manufacturers, a technician may need special skills, training, knowledge, and even custom-made tools to properly install a center tube to a vehicle. If these components are not properly installed, it may raise safety concerns, which may result in undesirable damage to the vehicle and potentially to a vehicle driver/passenger. In addition, for an unsophisticated/untrained technician, properly installation of the related components can be time-consuming. Therefore, it is advantageous to have an improved apparatus that is easy to assemble and safe to install. It is also beneficial and convenient to have an improved apparatus compatible for various types of vehicle spindles made by different manufacturers.

BRIEF DESCRIPTION OF THE DRAWINGS

Embodiments of the center linkage apparatus disclosed herein may be better understood by referring to the following Detailed Description in conjunction with the accompanying drawings, in which like reference numerals indicate identical or functionally similar elements.

FIG. 10 is a schematic diagram illustrating a tie rod end component and other components associated with embodiments of the present disclosure.

FIG. 9 is an isometric view of a tie rod end component according to another representative embodiment.

FIG. 10 is an end view of the tie rod end shown in FIG. 9.

FIG. 11 is an isometric view of a tie rod end component according to another representative embodiment.

FIG. 12 is an end view of the tie rod end shown in FIG. 11.

FIG. 13 is an isometric view of a tie rod end component according to another representative embodiment.

FIG. 14 is an end view of the tie rod end shown in FIG. 13.

Figure 1A:
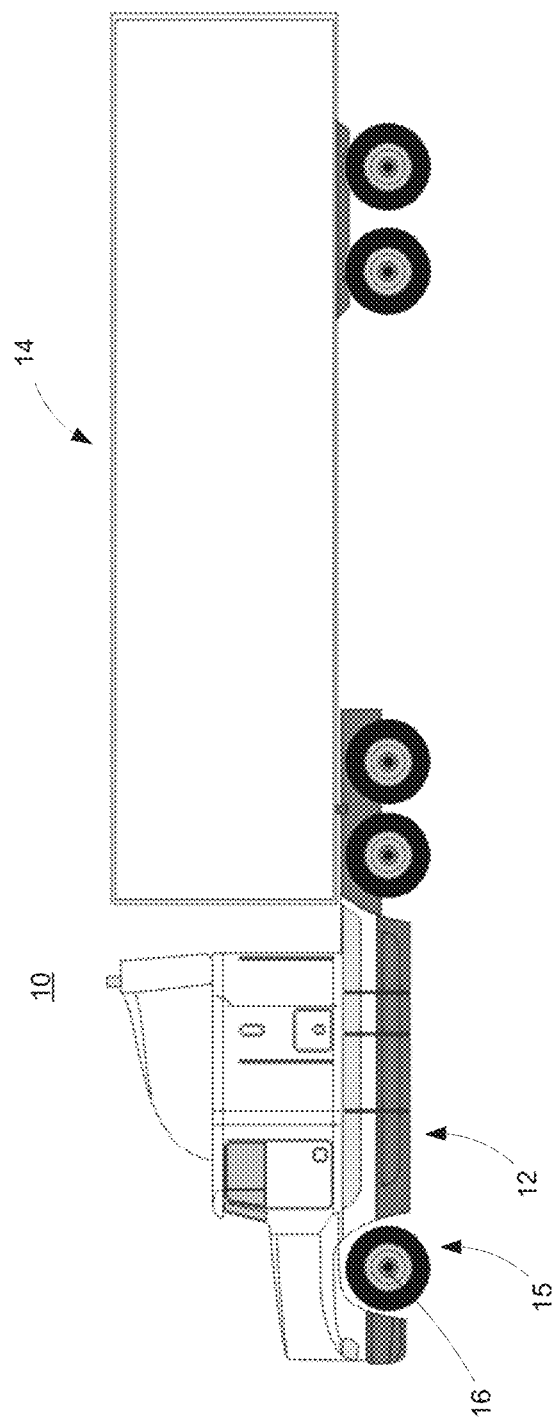
FIG. 1A is a schematic side view of a semi-trailer truck in which an apparatus in accordance with embodiments of the present disclosure is installed.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Overview

An apparatus for connecting a first component (e.g., a spindle of a vehicle) and a second component (e.g., another spindle of the vehicle) is disclosed. The first component is positioned opposite to the second component. The apparatus includes a center component having a hollow space, a first end, a second end, and an inner surface. The inner surface has a first threaded area positioned at the first end and a second threaded area positioned at the second end. The apparatus also includes a first tie rod end component having a first threaded surface and a second tie rod end component having a second threaded surface. The first and second tie rod end components are configured to be rotatably coupled to the center component in opposite directions (e.g., one is rotatably installed into the center component in a clockwise direction, whereas the other is rotatably installed in a counterclockwise direction). When the first and second tie rod end components are positioned in the hollow space of the center component, the first and second threaded surfaces are in contact with the first and second threaded area, respectively, such that the center component and the first and second tie rod end components can be coupled by the corresponding threaded areas/surfaces. The first and second tie rod end components are further coupled to the first and second components respectively. In particular embodiments, the apparatus includes clamping components coupled to the center component and configured to ensure that the center component is securely coupled to both of the tie rod end components. In some embodiments, the apparatus can have two tie rod end components with different dimensions or form factors for a user to select from. Having multiple tie rod end components enables the apparatus to be applied or installed on various types of vehicles.

General Description

Various examples of the apparatus introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

The present disclosure provides an apparatus for connecting two spindles of a vehicle. The apparatus is safe, easy to use, and suitable/compatible for various types of vehicle spindles. The apparatus includes a center component, a first tie rod end component, and a second tie rod end component. The first tie rod end component is configured to be coupled to one spindle of the vehicle and the second tie rod end component is configured to be coupled to the other spindle of the vehicle. When a user installs the apparatus to the vehicle, he/she can first attach the first/second tie rod ends to the center component by rotating and moving the first/second tie rod end components relative to the center component. The outer surfaces of the first/second tie rod end components and the inner surface of the center component include threaded areas/surfaces. The threaded areas/surfaces facilitate engaging and securing these components.

One feature of the apparatus is that the two tie rod end components are rotated into the center component in different directions (e.g., clockwise and counterclockwise) so as to minimize the risks of installation errors (e.g., a technician will immediately notice an error when he/she tries to install a tie rod end component at a wrong side of a center component). In some embodiments, the apparatus can include a groove or a mark positioned on one or both of the first/second tie rod end components to indicate whether these components are properly installed. For example, if the groove or the mark is visible to a user, then he/she may need to further rotate/move the tie-rod end component into the center component until the groove or the mark is positioned inside the center component and becomes hidden from outside of the center component.

FIG. 1A is a schematic side view of a semi-trailer truck 10 in which an apparatus in accordance with embodiments of the present disclosure is installed. The semi-trailer truck 10 includes a tractor unit 12 and a semi-trailer 14 connected thereto. As shown, the semi-trailer truck 10 includes multiple wheels 15 and corresponding spindles 16. Each wheel 15 is coupled to a correspond one of the spindles 16. Two of the spindles 16 can be coupled together by a connecting apparatus (not shown in FIG. 1A). The connecting apparatus includes two tie rod end components and a center component. The connecting apparatus will be discussed in detail with reference to FIG. 1B, FIG. 2, and FIG. 3 below.

Figure 1B:
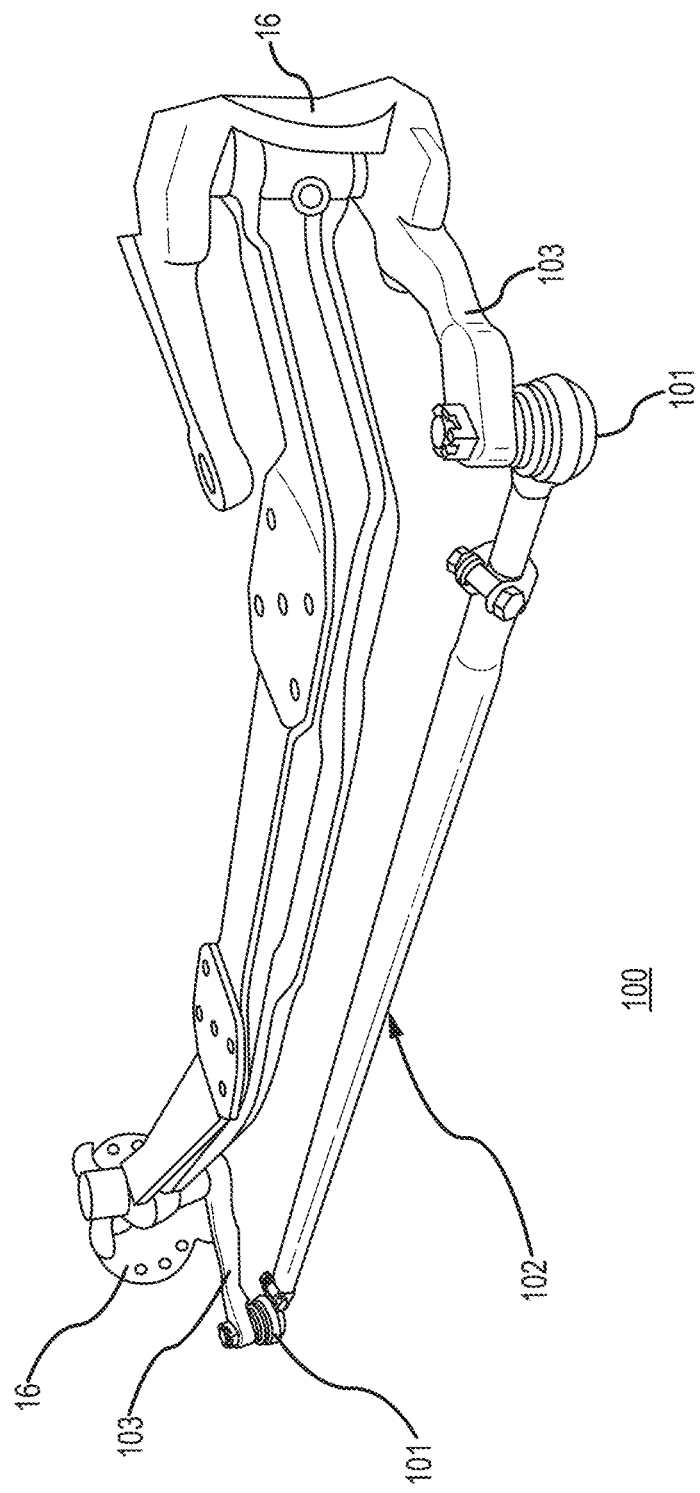
FIG. 1B is a schematic isometric view illustrating an apparatus associated with embodiments of the present disclosure.

FIG. 1B is a schematic isometric view illustrating an apparatus 100 associated with embodiments of the present disclosure. As shown, the apparatus 100 includes two tie rod end components 101 and a center component 102 (e.g., center link). The tie rod end component 101 is coupled to the spindle 16 via a tie rod arm 103. As shown in FIG. 1B, the center component 102 is coupled to the two tie rod end components 101 on both ends. To function properly, the apparatus 100 (including the two tie rod ends 101 and the center component 102) needs to be tightly secured/fastened/mounted with the spindles 16 via, for example, the tie rod arms 103. One skilled in the relevant art will understand that, in other embodiments, the tie rod arms 103 and the spindles 16 can have various arrangements depending on different designs.

Figure 1C:
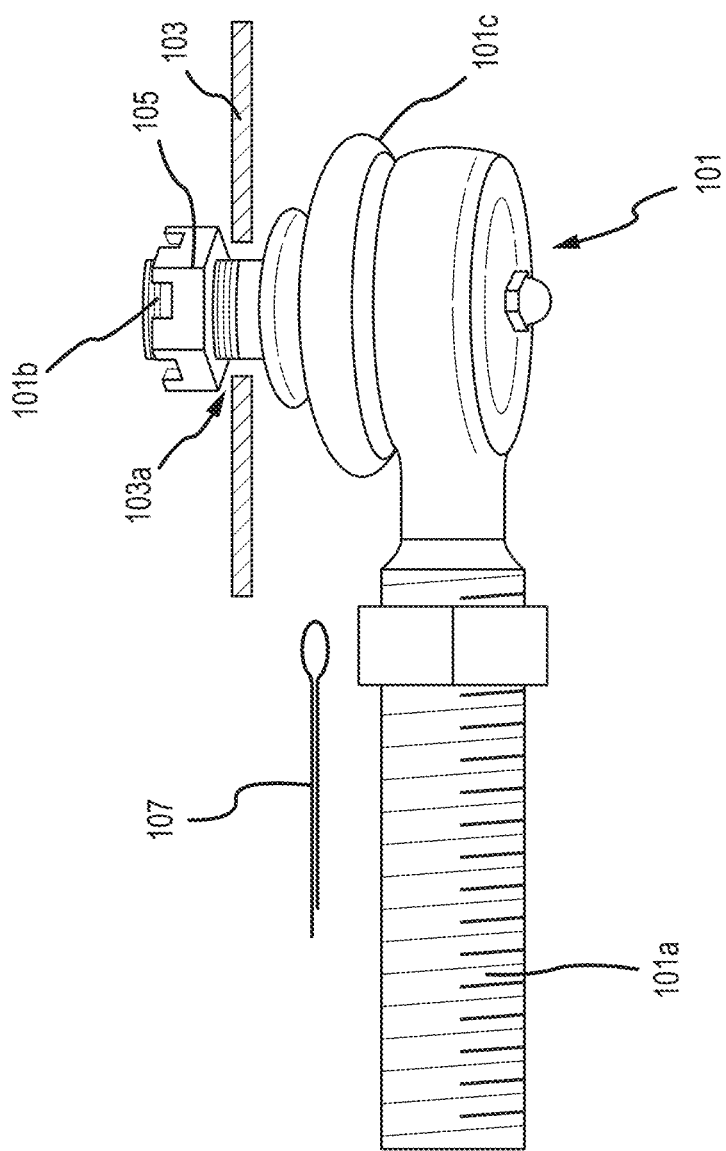
FIG. 1D is a schematic isometric diagram illustrating the internal structure of a spherical bearing of a tie rod end component in accordance with embodiments of the present disclosure.

FIG. 1C is a schematic diagram illustrating a tie rod end component 101 and other components associated with embodiments of the present disclosure. As shown in FIG. 1C, the tie rod end component 101 includes a main body 101a, a tapered stud 101b, and a spherical bearing 101c. The main body 101a is threaded and configured to operably couple to the center component 102 (FIG. 1B). The tapered stud 101b is configured to pass through a stud opening 103a of the tie rod arm 103 and configured to be in close contact with the tie rod arm 103. The spherical bearing 101c is configured to connect the main body 101a and the tapered stud 101b. To make sure that the tie rod end component 101 and the tie rod arm 103 are tightly secured/fastened/mounted during operation, a castle nut 105 and a split pin 107 can be used to facilitate the locking between the tie rod end component 101 and the tie rod arm 103. In some embodiments, the tie rod end component 101 and the tie rod arm 103 can be locked/secured by other suitable means.

Figure 1D:
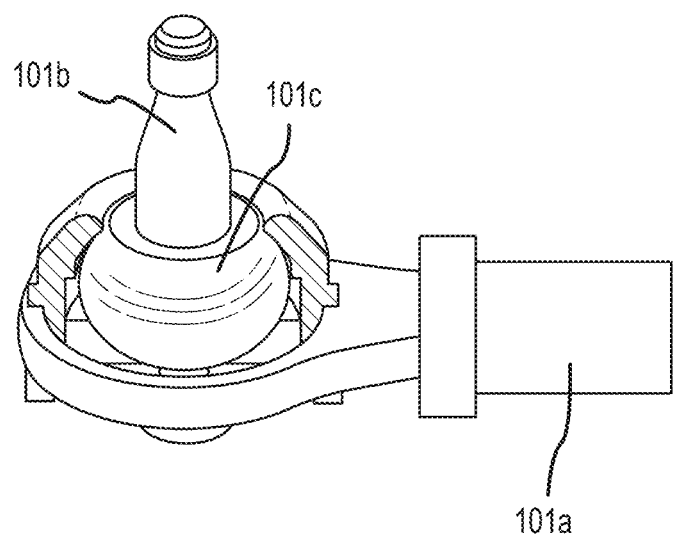

FIG. 1D is a schematic isometric diagram illustrating the internal structure of the spherical bearing 101c of the tie rod end component 101 in accordance with embodiments of the present disclosure. As shown, the spherical bearing 101c is configured to connect the main body 101a and the tapered stud 101b. The spherical bearing 101c enables the tie rod end component 101 to be properly coupled to the spindle 16 at various angles by providing a space for rotational articulation between the main body 101a and the tapered stud 101b.

Figure 2:
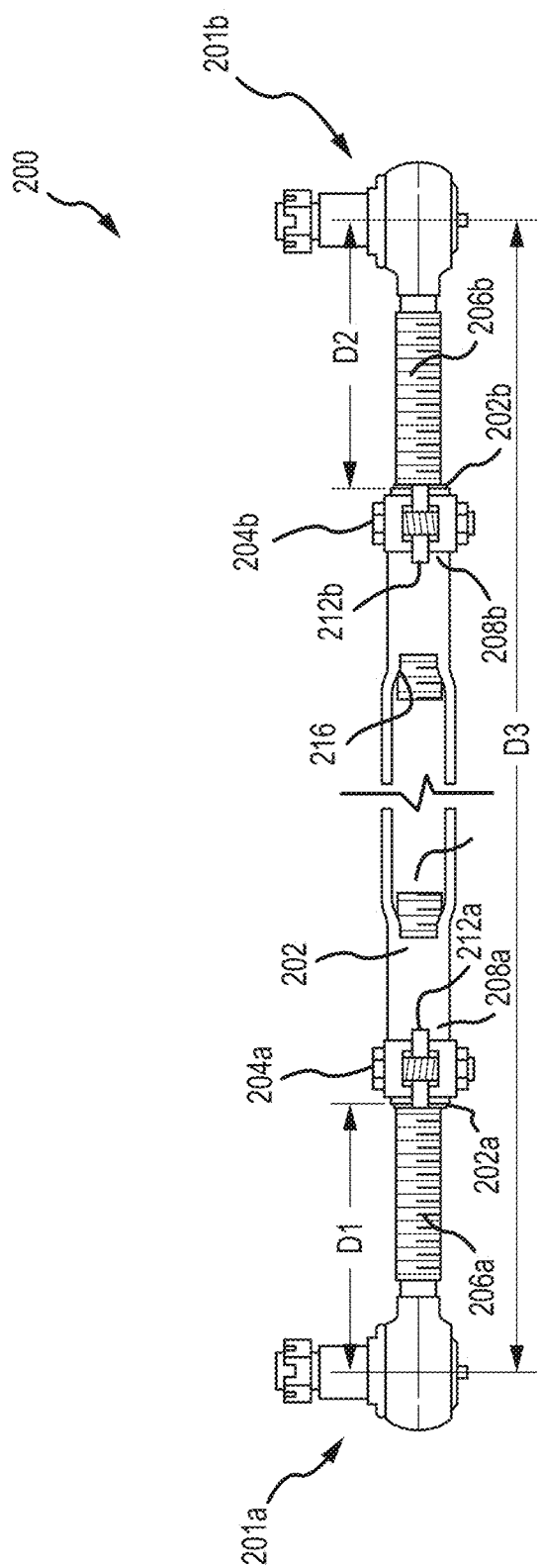
FIG. 2 is a schematic side view of an apparatus associated with embodiments of the present disclosure.

FIG. 2 is a schematic side view of an apparatus 200 associated with embodiments of the present disclosure. The apparatus 200 is configured to connect a first component (e.g., a first spindle) of a moveable system (e.g., a vehicle) and a second component (e.g., second spindle) of the moveable system so as to enhance steering control of the moveable system and/or improve the structural rigidity of the same. The apparatus 200 includes a first tie rod end component 201a, a second tie rod end component 201b, and a center component 202. The first tie rod end component 201a is configured to be coupled to the first component of the moveable system. The second tie rod end component 201b is configured to be coupled to the second component of the moveable system.

In particular embodiments, the first component is positioned opposite to the second component. In other embodiments, however, the first component and the second component can be positioned at different locations of the moveable system depending on various designs. In some embodiments, the first tie rod end component 201a is coupled to the first component via a first tie-rod arm. In some embodiments, the second tie rod end component 201b is coupled to the second component via a second tie-rod arm. As shown in FIG. 2, the first tie rod end component 201a includes a first threaded surface 206a. The second tie rod end component 201b includes a second threaded surface 206b.

The center component 202 includes a hollow space 210 defined by a housing of the center component 202 and an inner surface 216. The inner surface 216 includes a first threaded area corresponding to the first threaded surface 206a of the first tie rod end component 201a and a second threaded area corresponding to the second threaded surface 206b of the second tie rod end component 201b. The hollow space 210 is configured to accommodate portions of the first and second tie rod end components 201a, 201b such that the center component 202 can be properly attached to the first and second tie rod end components 201a, 201b. In some embodiments, the hollow space 210 can include separate sub-spaces. For example, the hollow space 210 can include a first hollow space at the first end 202a of the center component 202 and a second hollow space 210 at the second end 202b of the center component 202.

The center component 202 includes a first end 202a and a second end 202b opposite to the first end. The center component 202 is configured to be coupled to the first component via the first tie rod end component 201a at the first end 202a (e.g., a portion of the first tie rod end component 201a is rotated/moved into and positioned in the hollow space 210). At the second end 202b, the center component 202 is coupled to the second component via the second tie rod end component 201b (e.g., a portion of the second tie rod end component 201b is rotated/moved into and positioned in the hollow space 210). In some embodiments, the first tie rod end component 201a is rotated/moved into the hollow space 210 by engagement or cooperation of the first threaded surface 206a and the first threaded area. The second tie rod end component 201b is rotated/moved into the hollow space 210 by engagement or cooperation of the second threaded surface 206b and the second threaded area. The first threaded surface 206a matches the first threaded area, whereas the second threaded surface 206b matches the second threaded area. If a user inadvertently inserts the first tie rod end component 201a to the wrong side (e.g., the second end 202b) of the center component 202, the user won't be able to insert it at least because the first threaded surface 206a does not match the second threaded area at the second end 202b of the center component 202. By this design, the apparatus 200 can effectively reduce the risks of improper installation and accordingly increase safety.

In some embodiments, the first tie rod end component 201a can be rotated and moved into the hollow space 210 in a first direction (e.g., clockwise), and the second tie rod end component 201b can be rotated and moved into the hollow space 210 in a second direction (e.g., counterclockwise). This feature provides a user a convenient way to connect the two tie rod ends 201a, 201b with the center component 202. In addition, this direction-specific installation arrangement can also reduce improper installation and accordingly improve safety.

As shown in FIG. 2, the apparatus 200 can include a first clamping component 208a positioned at the first end 202a of the center component 202 and a second clamping component 208b positioned at the second end 202b of the center component 202. The first/second clamping components 208a, 208b include multiple first/second slots 212a, 212b (only one first slot 212a and one second slot 212b are shown in FIG. 2) configured to provide leeway or working space for a user to insert/rotate/install the tie rod end components 201a, 201b in the hollow space 210. Once the insertion/rotation/installation is complete, the user can apply a force on the clamping components 208a, 208b and accordingly the slots 212a, 212b become smaller (e.g., the sizes of the gaps defined by the slots 212a, 212b reduce due to the force). Accordingly, the center component 202 and the tie rod ends 201a, 201b are securely coupled. In some embodiments, the first and second clamping components 208a, 208b can be integrally formed with the center component 202. In some embodiments, the first and second clamping components 208a, 208b can be portions of the center component 202.

The apparatus 200 further includes a first locking component 204a positioned adjacent to the first slot 212a and a second locking component 204b positioned adjacent to the second slot 212b. The first and second locking component 204a, 204b are configured to (inwardly) push the housing of the center component 202 toward the inserted portions of the tie rod end components 201a, 201b such that the center component 202 and the tie rod end components 201a, 201b are tightly/closely connected. In the illustrated embodiment, the first and second locking component 204a, 204b include locking rings or clamps, bolts, and nuts. In other embodiments, the first and second locking components 204a, 204b can have other suitable components such as belts, latches, snaps, etc.

In some embodiments, the apparatus 200 can include a groove or mark (not shown in FIG. 2; see FIG. 4 for details) positioned on the tie rod end components 201a, 201b so as to indicate whether the tie rod end components 201a, 201b are properly coupled to the center component 202. For example, if the groove or the mark is visible to a user, then he/she may need to further rotate/move the tie-rod end components 201a, 201b into the center component 202 until the groove or the mark is positioned inside the center component 202 and becomes hidden from the outside of the center component 202.

In some embodiments, a user can use distances D1, D2, and/or D3 to verify whether the tie rod end components 201a, 201b are properly coupled to the center component 202. D1 represents a distance between the centerline of the first tie rod end component 201a to the first end 202a of the center component 202. D2 represents a distance between the centerline of the second tie rod end component 201b to the second end 202b of the center component 202. D3 represents a distance between the centerline of the first tie rod end component 201a to the centerline of the second tie rod end component 201b. By measuring distances D1, D2, and/or D3 and comparing the measured result with reference values (e.g., if D1 is less than 5 cm, then the installation is proper), a user can verify whether the tie rod end components 201a, 201b and the center component 202 are properly installed. Also, the general configuration or adjustment of D3 allows the apparatus to be used on multiple vehicles enabling the user to have two part numbers to choose from. The adjustment and locking of D3 facilitates the proper alignment of spindles 16 (FIG. 1B). Proper alignment is part of not only the replacement of worn components but to adjust for general wear and tear of the components.

Figure 3:
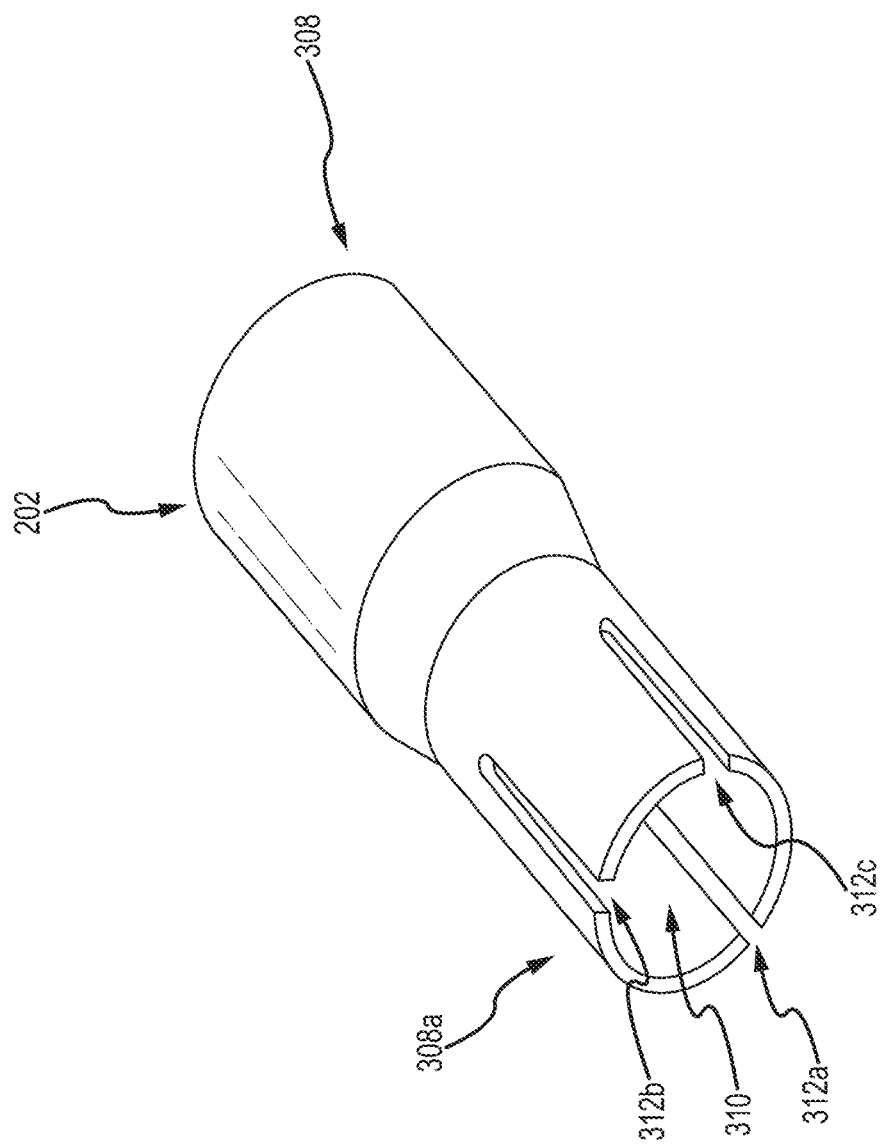
FIG. 3 is a schematic isometric view of a tube end clamp location according to embodiments of the present disclosure.

FIG. 3 is a schematic isometric view of a clamping component 308 associated with embodiments of the present disclosure. As shown in FIG. 3, the clamping component 308 can be disposed on or integral with the center component 202, for example. The clamping component 308 can include a tapered end 308a and three slots, 312a, 312b, and 312c. The clamping component 308 defines a hollow space 310 therein. The hollow space 310 is configured to accommodate a tie rod end component (such as the tie rod end component 101, 201a, or 201b). In some embodiments, the clamping component 308 can be fixedly coupled to a center component (such as the center component 102 or 202) or be a portion of the center component. In the illustrated embodiments, the clamping component 308 includes three slots, 312a, 312b, and 312c positioned circumferentially around the clamping component 308. In other embodiments, however, the clamping component 308 can include a different number of slots (including one slot) with different arrangements depending on various design needs.

Figure 4:
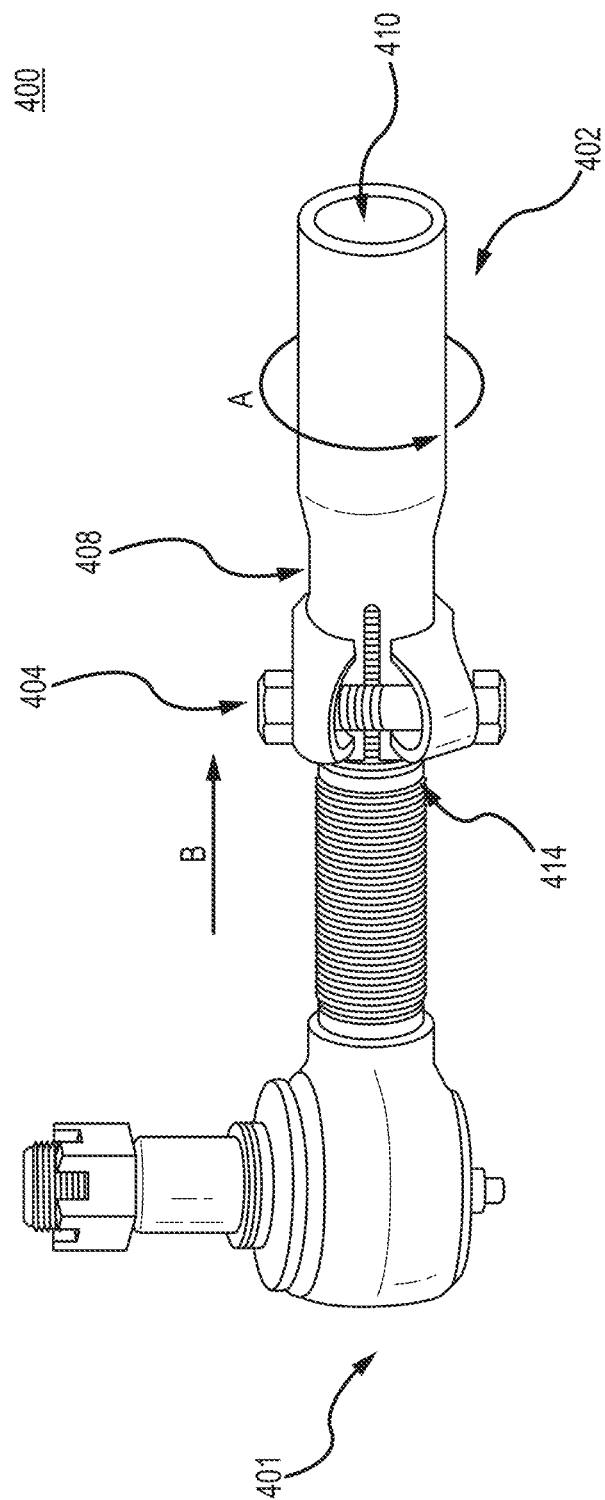
FIG. 4 is a schematic isometric view illustrating a portion of an apparatus associated with embodiments of the present disclosure.

FIG. 4 is a schematic isometric view illustrating a groove 414 of an apparatus 400 associated with embodiments of the present disclosure. As shown in FIG. 4, the apparatus 400 includes a tie rod end component 401 and a center component 402 (only shown partially in FIG. 4) configured to be coupled to the tie rod end component 401. The center component 402 includes a clamping portion 408 positioned at one end of the center component 402. As shown in FIG. 4, the center component 402 defines a hollow space 410. The apparatus 400 further includes a locking component 404 configured to (inwardly) push the center component 402 toward the inserted portion of the tie rod end component 401 such that the center component 402 and the tie rod end component 401 are tightly/closely coupled. In other words, the locking component 404 clamps the clamping portion 408 against the threads of the tie rod end 401. As shown in FIG. 4, the tie rod end component 401 includes an assembly indicator, such as groove 414 positioned thereon. The groove is designed to assist a user to determine whether the tie rod end component 401 is properly coupled to the center component 402. For example, if the groove 414 is visible to a user (as shown in FIG. 4), then he/she may need to further rotate the center component 402 in direction A such that the tie rod end component 410 moves further into the hollow space 410 of the center component 402 in direction B. When the groove 414 is positioned inside the center component 202 and becomes hidden from the outside of the center component 202, it indicates that the tie rod end component 401 and the center component 402 are properly installed. In other various embodiments, the assembly indicator can comprise any suitable indicator, such as for example and without limitation, dashes, dimples, flats, or other suitable indicia formed in or on the tie rod end threaded portion.

Figure 5:
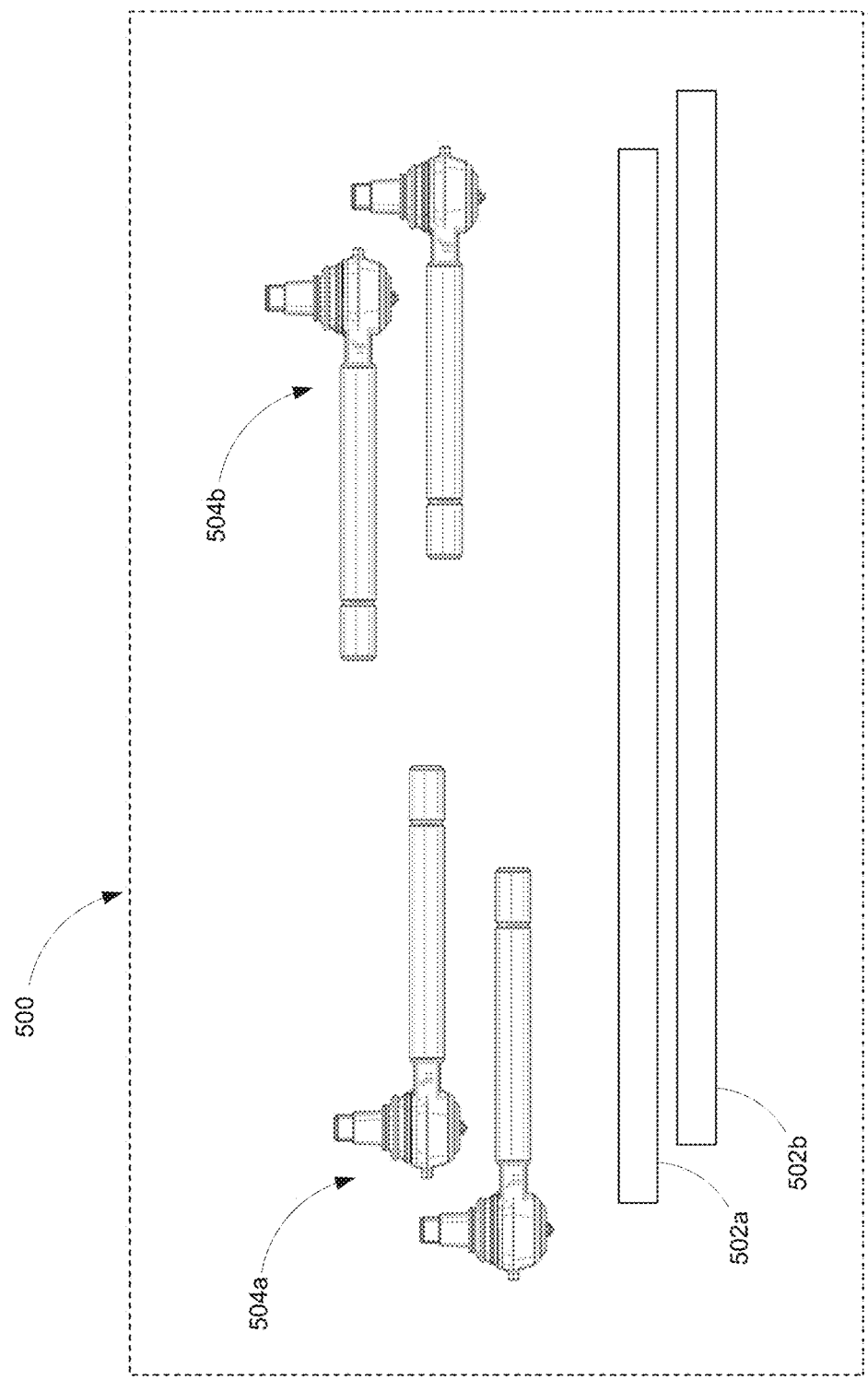
FIG. 5 is a schematic representation of a center link assembly kit according to a representative embodiment.

Also disclosed herein is a kit 500 for a universal center link assembly comprising one or more center tubes 502a and 502b, and one or more pairs of tie rods ends 504a and 504b, as shown in FIG. 5. In some embodiments, the center tube length is selected such that in combination with the lengths of the tie rod ends (see FIG. 2) the assembly can be fitted to many different vehicles. Accordingly, a repair facility need only stock the universal center link assembly kit 500. In some embodiments, the kit 500 can include two different pairs of tie rod ends, each pair having a different taper on the tie rod end studs to accommodate spindle arms having different taper angles and/or depths. In various embodiments, different combinations and lengths of any of the tie rod ends and/or center links disclosed herein can be combined to create a kit.

In some embodiments, the components of the assembly (e.g., center tube and tie rod ends) have non-standard thread sizes to prevent improperly combining disclosed components with standard or OEM components. For example the disclosed components can include M34×1.5 metric threads rather than standard threads (e.g., 1.125-12 or 1.250-12 English threads). The M34×1.5 metric thread is also stronger and provides a finer toe adjustment of the center link assembly.

Figure 6:
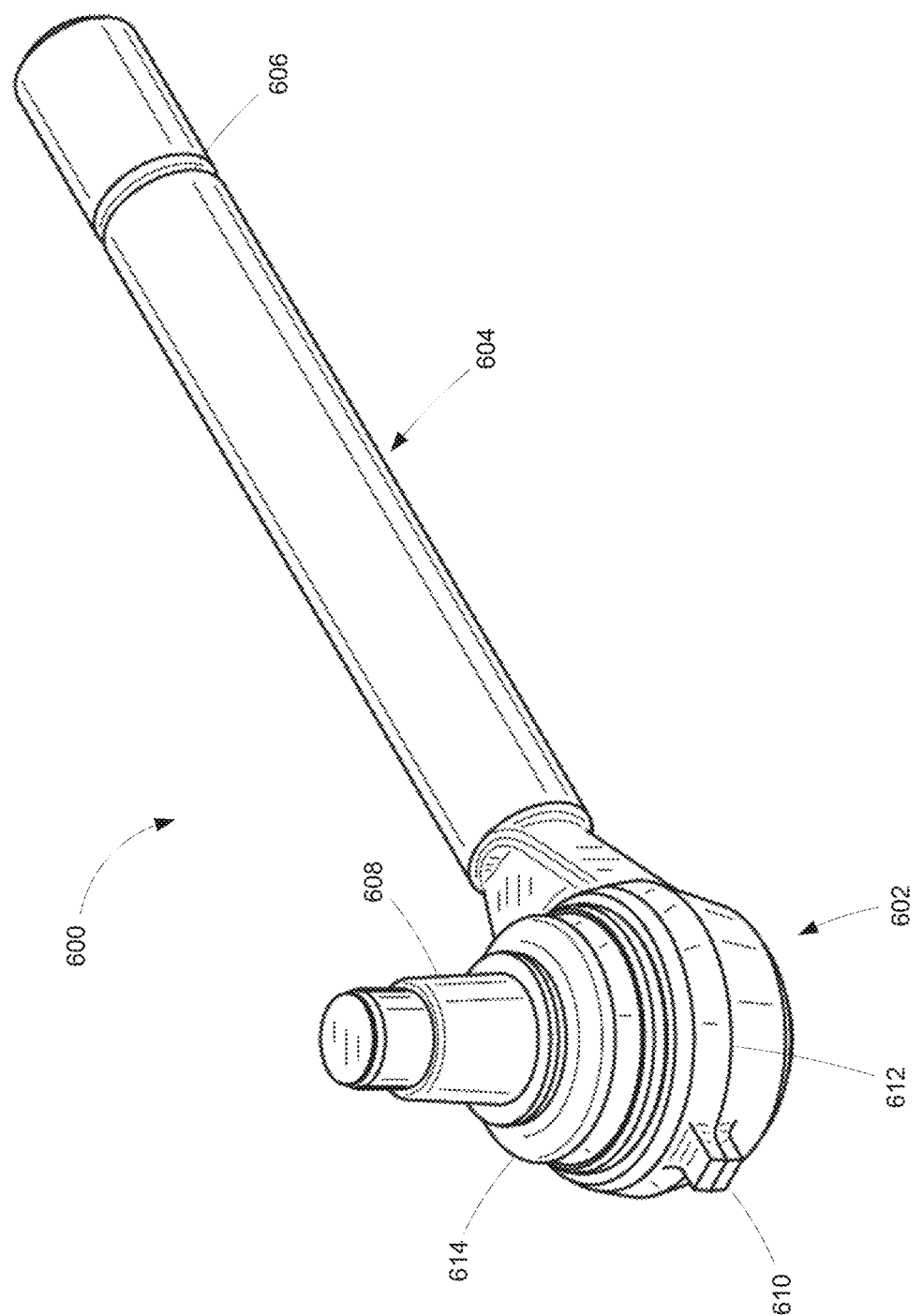
FIG. 6 is an isometric view of a tie rod end component according to another representative embodiment.
Figures 7, 8:
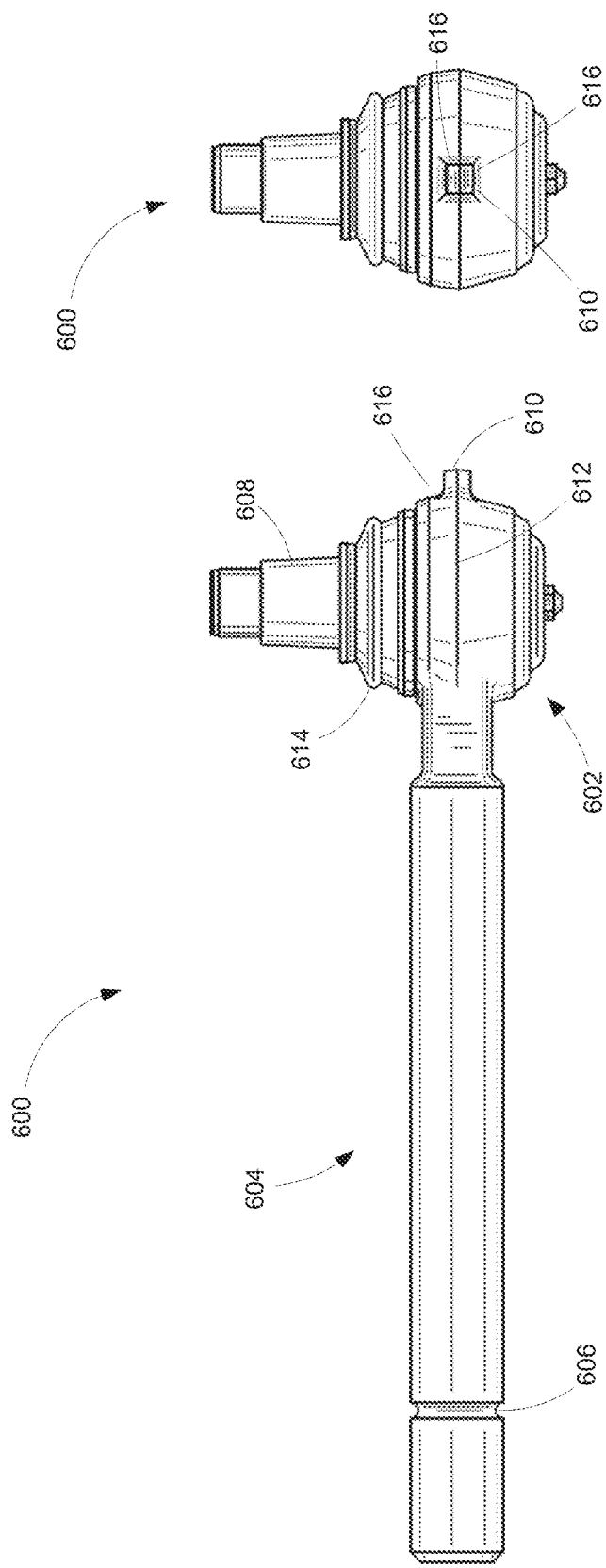
FIG. 7 is a side view of the tie rod end introduced in FIG. 6.
FIG. 8 is an end view of the tie rod end shown in FIGS. 6 and 7.

FIGS. 6-8 illustrate a tie rod end 600 configured according to another representative embodiment of the disclosed technology. The tie rod end 600 includes a body portion 602 and a threaded rod portion 604 extending longitudinally therefrom. The threaded rod portion 604 can include an indicator groove 606 positioned to indicate whether the tie rod end 600 is properly installed (i.e., threaded) into an associated center link or center tube, such as center component 602 (FIG. 4). A tapered stud 608 extends laterally from the body portion 602 and is configured to mate with a steering arm of a spindle knuckle. The tapered stud 608 and body portion 602 comprise a ball and socket joint, which can be covered with a flexible boot 614 to prevent contamination of the sliding surfaces within the joint.

Extending longitudinally from the body portion 602 on a side generally opposite the threaded rod portion 604 is a drive element 610. In some embodiments, the drive element 610 is coaxial with the threaded rod portion 604. The drive element 610 allows a technician to connect a conventional tool, such as a socket or wrench, to the tie rod end 600 in order to rotationally drive the tie rod end 600, thereby quickly threading the threaded rod portion 604 into or out of the center tube. In some embodiments, the socket can be driven with a pneumatic tool, such as an air wrench, for example. In some embodiments, the threaded rod portion 604 can be long relative to conventional tie rod ends in order to accommodate different center link applications. Being able to employ pneumatic tools to install the tie rod end 600 can provide a significant time and cost benefits. Optionally, the drive element 610 can be removed from the body portion 602 with a grinder or cut-off wheel, for example, once the center link assembly is installed in the vehicle.

In some embodiments, the body portion 602 includes a parting line 612 (e.g., a slight ridge) where two molds or dies used to form the body portion 602 and rod portion 604 mate during manufacturing. In some embodiments, the drive element 610 is positioned on the body portion 602 such that it crosses the parting line 612. Positioning the drive element 610 in this way can simplify the molds/dies used to form the body portion 602 and the rod portion 604. In addition, the drive element 610 can include fillets or radiuses 516, as shown, between the body portion 602 and the drive element 610 to facilitate manufacturing and to provide stress relief where the drive element 610 joins the body portion 602.

As best shown in FIG. 8, the drive element 610 can have a square cross section. However, in various other embodiments the drive element 610 can have any suitable shape. For example and without limitation, the drive element 610 can be a polygon such as a triangle, rectangle, pentagon, hexagon, octagon, etc. Furthermore, the drive element can comprise a hole in the body portion 602 having a suitable shape for engaging a tool, such as a torx or hex (i.e., allen) bit.

FIGS. 9 and 10 illustrate a tie rod end 640 configured according to another representative embodiment of the disclosed technology. The tie rod end 640 includes a body portion 642 and a threaded rod portion 644 extending longitudinally therefrom. The tie rod end 640 is generally configured in a similar manner as that described above with respect to tie rod end 600 (FIGS. 6-8). However, the drive element 646 has a diamond shaped cross section. In some embodiments, opposite points of the diamond shaped drive element 646 are aligned with the parting line 648 as shown in FIG. 10.

FIGS. 11 and 12 illustrate a tie rod end 660 configured according to another representative embodiment of the disclosed technology. The tie rod end 660 includes a body portion 662 and a threaded rod portion 664 extending longitudinally therefrom. The tie rod end 660 is generally configured in a similar manner as that described above with respect to tie rod end 600 (FIGS. 6-8). However, the drive element 666 has a hexagonal shaped cross section. In some embodiments, opposite points of the hexagonal shaped drive element 666 are aligned with the parting line 668 as shown in FIG. 12.

FIGS. 13 and 14 illustrate a tie rod end 680 configured according to another representative embodiment of the disclosed technology. The tie rod end 680 includes a body portion 682 and a threaded rod portion 684 extending longitudinally therefrom. The tie rod end 680 is generally configured in a similar manner as that described above with respect to tie rod end 600 (FIGS. 6-8). The drive element 686 has a hexagonal shaped cross section similar to that of tie rod end 660. However, in the depicted embodiment, opposite flats of the hexagonal shaped drive element 686 are aligned with the parting line 688 as shown in FIG. 14.

In some embodiments, the clamps on the universal center link assembly are color coded to identify left and right so that the assembly is installed on the vehicle in the correct orientation. In situations where the tie rod ends are sold separately their individual packaging can have similar color coding. For reference, the color coding can be yellow for left and green for right which follows the color coding convention of the vehicle's wiring harness, which uses yellow for the left turn signal and green for the right, for example.

In light of the foregoing, the disclosed technology provides the following improved features for an apparatus for connecting two components (e.g., a spindle) of a moveable system: increasing flexibility and convenience when installing; reducing the risks of improper installation, universal applicability to most of the components by interchangeable tie rod end components suitable for various components-to-be-connected.

Although particular embodiments of the apparatus are described herein, it should not be interpreted as limiting and other embodiments and variations are possible. For example, the following features can be varied without deviating from the scope of the disclosed technology: the number/location of the slots, the shapes of the center component and the tie rod end components, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "particular embodiment" or "some embodiments" means that a particular feature, structure, or characteristic described in connection with the embodiment is included in at least one embodiment of the disclosure. The appearances of the phrase "in particular embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. An apparatus for connecting a first component and a second component of a movable system, the first component being positioned opposite to the second component, the apparatus comprising:

a center component having a hollow space, the center component having a first end portion and a second end portion, the center component having an inner surface, the inner surface having a first threaded area at the first end portion and a second threaded area at the second end portion;

a first tie rod end component having a first main body and a first threaded surface configured to rotatably couple to the center component, wherein the first threaded surface is in contact with the first threaded area when the first tie rod end is positioned in the hollow space of the center component, wherein the first tie rod end component includes a first groove adjacent a distal end of the first threaded surface opposite the first main body and configured to indicate a first depth of a first portion of the first tie rod end component that is positioned inside the center component; and a second tie rod end component having a second main body and a second threaded surface and configured to rotatably couple to the center component, wherein the second threaded surface is in contact with the second threaded area when the second tie rod end component is positioned in the hollow space of the center component, wherein the second tie rod end includes a second groove adjacent a distal end of the second threaded surface opposite the second main body and configured to indicate a second depth of a second portion of the second tie rod end component that is positioned inside the center component;

wherein the first tie rod end component is rotatable relative to the center component in a first direction, and wherein the second tie rod end component is rotatable relative to the center component in a second direction opposite to the first direction, and wherein the first groove and the second groove are circumferential grooves and each have a width greater than a distance between threads of the first threaded surface and the second threaded surface, respectively.

2. The apparatus of claim 1, wherein the center component includes a first slot at the first end and a second slot at the second end.

3. The apparatus of claim 2, wherein the apparatus further comprises a first locking component positioned adjacent to the first slot and a second locking component positioned adjacent to the second slot.

4. The apparatus of claim 1, further comprising a first clamping component configured to operably couple to the center component at the first end portion, wherein the first clamping component includes a first slot.

5. The apparatus of claim 4, further comprising a first locking component positioned adjacent to the first slot.

6. The apparatus of claim 5, further comprising a second clamping component configured to operably couple to the center component at the second end portion, wherein the second clamping component includes a second slot.

7. The apparatus of claim 6, further comprising a second locking component positioned adjacent to the second slot.

8. The apparatus of claim 1, wherein the movable system includes a vehicle having a first wheel and a second wheel.

9. The apparatus of claim 8, wherein the first component includes a first spindle coupled to the first wheel, and wherein the second component includes a second spindle opposite to the first spindle and coupled to the second wheel.

10. The apparatus of claim 1, wherein the hollow space includes a first hollow space at the first end portion of the center component and a second hollow space at the second end portion of the center component.

11. The apparatus of claim 10, wherein the first threaded surface is in contact with the first threaded area when the first tie rod end component is positioned in the first hollow space, and wherein the second threaded surface is in contact with the second threaded area when the second tie rod end component is positioned in the second hollow space.

12. The apparatus of claim 1, wherein the first tie rod end includes the first main body, a first tapered stud, and a first spherical bearing.

13. The apparatus of claim 12, wherein the first threaded surface is positioned on the first main body.

14. The apparatus of claim 13, wherein the second tie rod end includes the second main body, a second tapered stud, and a second spherical bearing.

15. The apparatus of claim 14, wherein the second threaded surface is positioned on the second main body.

16. The apparatus of claim 1, wherein the center component comprises a center tube.

17. The apparatus of claim 1, wherein the center component comprises a center linkage member.

18. The apparatus of claim 1, wherein the first tie rod end component and the second tie rod end component each include a drive element positioned on a respective main body portion thereof and opposite the the respective first and second threaded surfaces.

19. The apparatus of claim 18, wherein the drive elements comprise a longitudinally extending polygon.

* * * * *